(12) United States Patent
Dong et al.

(10) Patent No.: US 7,060,155 B2
(45) Date of Patent: Jun. 13, 2006

(54) METHOD AND APPARATUS FOR SOFT SKIN ENCAPSULATION

(75) Inventors: Daojie Dong, Westerville, OH (US); Liang Chen, New Albany, OH (US); Michael T. Pellegrin, Newark, OH (US); Clarke Berdan, II, Granville, OH (US); Randall M. Haines, Frazeysburg, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 360 days.

(21) Appl. No.: 10/328,968

(22) Filed: Dec. 24, 2002

(65) Prior Publication Data

US 2004/0118511 A1 Jun. 24, 2004

(51) Int. Cl.
*B32B 31/12* (2006.01)
*B32B 31/04* (2006.01)

(52) U.S. Cl. .................... 156/278; 156/307.5; 428/74; 428/76; 427/372.2; 427/384; 427/388.4; 427/389.7; 427/393.3; 427/421

(58) Field of Classification Search ................ 428/74, 428/76; 156/278, 307.3, 307.5; 427/372.2, 427/374.1, 384–386, 388.4, 388.5, 389.7, 427/389.8, 393.3, 398.1–398.3, 421, 424
See application file for complete search history.

(56) References Cited

U.S. PATENT DOCUMENTS

| | | | |
|---|---|---|---|
| 2,211,309 A | 8/1940 | Zimmerman | |
| 2,244,097 A * | 6/1941 | Burkart | 428/74 |
| 3,632,372 A | 1/1972 | Heslop et al. | |
| 3,765,998 A | 10/1973 | Oswald et al. | |
| 3,784,396 A | 1/1974 | Fourment et al. | |
| 3,903,879 A | 9/1975 | Riley et al. | |
| 3,912,542 A | 10/1975 | Hirano et al. | |
| 4,002,367 A | 1/1977 | Thomas | |
| 4,067,480 A * | 1/1978 | Gasser | 222/146.3 |
| 4,076,884 A | 2/1978 | Riley et al. | |
| 4,133,928 A | 1/1979 | Riley et al. | |
| 4,162,344 A | 7/1979 | Rones | |
| 4,178,411 A | 12/1979 | Cole et al. | |
| 4,315,721 A | 2/1982 | Sorenson | |
| 4,761,279 A * | 8/1988 | Khalil et al. | 424/73 |
| 4,824,507 A | 4/1989 | D'Amico | |
| 4,879,173 A | 11/1989 | Randall | |
| 4,891,249 A | 1/1990 | McIntyre | |
| 5,006,373 A | 4/1991 | Woodmansee et al. | |
| 5,134,959 A | 8/1992 | Woodmansee et al. | |
| 5,169,580 A * | 12/1992 | Marcus | 264/115 |
| 5,169,712 A | 12/1992 | Tapp | |
| 5,211,988 A * | 5/1993 | Morton | 427/370 |
| 5,308,692 A | 5/1994 | Kennedy et al. | |
| 5,342,680 A | 8/1994 | Randall | |
| 5,482,667 A | 1/1996 | Dunton et al. | |
| 5,501,872 A | 3/1996 | Allen et al. | |
| 5,549,753 A * | 8/1996 | Matthews et al. | 118/316 |
| 5,614,307 A * | 3/1997 | Andersen et al. | 428/294.7 |
| 5,679,042 A | 10/1997 | Varona | |
| 5,718,785 A | 2/1998 | Randall | |
| 5,733,624 A | 3/1998 | Syme et al. | |
| 5,746,854 A | 5/1998 | Romes et al. | |

(Continued)

*Primary Examiner*—Sam Chuan Yao
(74) *Attorney, Agent, or Firm*—Inger H. Eckert; Maria C. Gasaway (57) ABSTRACT

The invention relates to an insulation product comprising an elongated fibrous batt with a polymeric encapsulating layer and, optionally, a vapor or other barrier layer on one or more surfaces of the fibrous batt and an apparatus for manufacturing such an insulation product.

8 Claims, 5 Drawing Sheets

U.S. PATENT DOCUMENTS

| | | |
|---|---|---|
| 5,879,615 A | 3/1999 | Syme et al. |
| 5,900,298 A | 5/1999 | Syme et al. |
| 5,981,406 A | 11/1999 | Randall |
| 5,983,586 A | 11/1999 | Berdan, II et al. |
| 6,039,821 A * | 3/2000 | Buck .......................... 156/62.2 |
| 6,045,912 A | 4/2000 | Taguchi |
| 6,084,021 A | 7/2000 | Chang et al. |
| 6,106,650 A | 8/2000 | Cheshire |
| 6,135,747 A | 10/2000 | Syme et al. |
| 6,191,057 B1 | 2/2001 | Patel et al. |
| 6,203,646 B1 | 3/2001 | Gundberg et al. |
| 6,221,464 B1 | 4/2001 | Patel et al. |
| 6,228,476 B1 * | 5/2001 | Bogrett et al. ........... 428/306.6 |
| 6,357,504 B1 | 3/2002 | Patel et al. |

* cited by examiner

METHOD AND APPARATUS FOR SOFT SKIN ENCAPSULATION

TECHNICAL FIELD AND INDUSTRIAL APPLICABILITY OF THE INVENTION

This invention relates to fibrous insulation products, and in particular those insulation products of the type suitable for insulating buildings. More specifically, this invention pertains to insulation products having an encapsulating layer and, optionally, a vapor barrier, for improving the handling characteristics and reducing dust and fiber generation in the resulting insulation products.

BACKGROUND OF THE INVENTION

Fibrous insulation is typically manufactured by fiberizing a molten composition of polymer or other minerals to form fine fibers and depositing the fibers on a collecting conveyor. Although mineral fibers, such as glass fibers, are typically used in insulation products, depending on the particular application organic fibers, such as polypropylene and polyester may be used singly or in combination with mineral fibers. Most fibrous insulation products also incorporate a binder composition to bond the fibers together where they contact each other within the batt or sheet to form a lattice or network. This lattice structure provides improved resiliency that allows the insulation product to recover a substantial portion of its thickness after being compressed and also provides improved stiffness and handleability. During the manufacturing process the insulation products are typically formed and cut to provide sizes generally compatible with standard construction practices. During actual installation of the insulation products, workers will typically cut or trim the standard products for the specific installation.

One typical insulation product is an insulation batt, usually about 8 feet (2.4 m) long sized for use as wall insulation in residential dwellings, or as insulation in the attic and floor insulation cavities in buildings. The width of insulation batts designed for wall cavities is set to typical insulation cavity widths, such as about 15 inches (38 cm) or 23 inches (58 cm) to accommodate standard U.S. stud spacings of 16 and 24 inches (41 and 61 cm), respectively. Some insulation products also incorporate a facing material on at least one of the major surfaces. In many cases the facing material is provided as a vapor barrier, while in other insulation products, such as binderless products, the facing material improves the product integrity.

Insulation products incorporating a vapor barrier are commonly used to insulate wall, floor or ceiling cavities that separate a warm moist space, typically the living spaces, from a cold space, typically the exterior, crawl space, or ground. In such applications, the vapor barrier is preferably placed to prevent warm moist air from diffusing toward the cold space where it would cool and condense within the insulation. Such a situation would result in a damp insulation product that cannot perform at its designed efficiency causing a loss in R-value. In predominately warm moist climates, however, it is not uncommon to reverse the typical installation in order to prevent vapor from entering the insulation cavity and approaching an air conditioned space.

There are, however, some applications that require an insulation product that does not incorporate or provide a vapor barrier, but rather allows water vapor to pass through fairly readily. For example, insulation products designed and intended for installation over existing attic insulation should not include a vapor barrier. Similarly, insulation products for wall cavities that have a separate full wall vapor barrier, such as a polyethylene film, applied over the insulation product.

A number of methods for encapsulating fibrous batts for improved handling properties are known. For example, U.S. Pat. No. 5,277,955 to Schelhorn et al. discloses an encapsulated batt in which the encapsulation material is adhered to the batt with an adhesive that can be applied in longitudinal stripes, or in patterns such as dots, or in an adhesive matrix. The Schelhorn patent also discloses that an alternative method of attachment is for the adhesive layer to be an integral part of the encapsulation film, which, when softened, bonds to the fibers in the batt and is hereby incorporated, in its entirety, by reference.

U.S. Pat. No. 5,733,624 to Syme et al. discloses a mineral fiber batt impregnated with a coextruded polymer layering system, and U.S. Pat. No. 5,746,854 to Romes et al. discloses a method for impregnating a mineral fiber batt with a coextruded film in which at least the coextruded film is heated before being applied to the fiber batt. The heat energy necessary to achieve the necessary degree of heating may be transferred primarily by conduction the coextruded film passes over a heated cylinder or through radiant infrared heaters. Attaching the coextruded film in this manner has some disadvantages in that the particular heating process cannot be abruptly terminated or quickly varied due to the large thermal mass provided by the heated cylinder. In addition, the heated cylinder does not provide a means for selectively heating portions of the coextruded film to different temperatures. These patents are hereby incorporated, in their entirety, by reference.

Many traditional vapor barriers for insulation products comprised a layer of asphalt covered with a layer of Kraft paper or a foil facing material. The asphalt layer was generally applied in molten form, covered with the facing material and pressed against the fibrous insulation material as it was cooled to bond the facing material to the fibrous batt. Although the asphalt and Kraft paper system is relatively inexpensive, the asphalt/Kraft combination layer tends to be relatively stiff and may slow the installation process by requiring more precise fitting. Further, during cold weather installations, cutting the facing without tearing the Kraft paper may be difficult because the asphalt becomes brittle. Conversely, during warm weather installations, the asphalt material can become sticky and foul the cutting tool.

U.S. Pat. No. 6,357,504 to Patel et al. provided an alternative means for attaching a facing layer to a fibrous batt in which the facing comprises a coextruded polymer film including both a barrier layer and a bonding layer, with the bonding layer having a softening point lower than the softening point of the barrier layer. The bonding layer could comprise a range of materials including ethylene N-butyl acrylate, ethylene methyl acrylate ethylene ethyl acrylate, low density polyethylene (LDPE) and ethylene vinyl acetate, both singularly and in combination. Accordingly, when the facing is heated to a temperature above the softening point of the bonding layer, but below the softening point of the barrier layer, the facing may be adhered to the batt as the bonding layer attaches to the fibers. This patent is hereby incorporated, in its entirely, by reference.

In addition to facing layers provided on one or more surfaces of a fibrous batt, some prior art applications provide for an encapsulating layer to improve the tactility of the insulation product during the handling and mounting, reduce or eliminate the release of fibers before, during or after mounting and improved tensile strength. One such method is disclosed in U.S. Pat. No. 6,203,646 to Gundberg et al. in which the encapsulating layer is formed directly on the surface of the fiber batt by forming a thermoplastic polymer melt distributing fibers formed from the polymer melt onto the fiber batt. In this method, the adhesive characteristics of the molten and partially molten thermoplastic polymers is used to adhere the layer to the underlying fibers without the use of any additional binder or adhesive composition. This patent is hereby incorporated, in its entirety, by reference.

Another method and apparatus for providing a melt blown encapsulating layer on a fiber batt is provided in U.S. Pat. No. 5,501,872 to Allen et al. in which a six-sided fibrous batt is coated with a nonwoven polymeric material by passing the batt sequentially through three coating stations. Four sides of the batt are coated in the first two stations and, after the batt is turned 90°, the final two sides are coated to completely encapsulate the batt in a fibrous nonwoven coating layer. This patent is hereby incorporated, in its entirety, by reference.

There still, however, remains a need for improved methods for encapsulating insulation products to enhance their handling and performance encapsulation methods.

SUMMARY OF THE INVENTION

The invention is directed, in part, to an insulation product comprising an elongated fibrous batt with a polymeric encapsulating layer and, optionally, a vapor barrier layer on one or more surfaces of the fibrous batt. The invention is also, in part, directed to an apparatus for manufacturing an insulation product comprising an elongated fibrous batt with a polymeric encapsulating layer and, optionally, a vapor barrier layer. The invention is also, in part, directed to a method of making an insulation product comprising an elongated fibrous batt with a polymeric encapsulating layer and, optionally, a vapor barrier layer.

The foregoing and other objectives of the present invention will become more apparent from the detailed description provided below. However, it should be understood that the detailed description and specific examples, while indicating preferred embodiments of the invention, are given by way of illustration only, and that various changes and modifications within the spirit and scope of the invention will be apparent to those skilled in the art when guided by the detailed disclosure.

BRIEF DESCRIPTION OF THE DRAWINGS

The present invention may be more fully understood from the detailed description provided below and by reference to the accompanying figures. These figures are provided by way of illustration only and do not, therefore, operate to limit the present invention as detailed by the accompanying claims.

The appended drawings are intended as illustrative only and are not necessarily drawn to a consistent scale and should not be taken to exclude auxiliary equipment and processes in a coating operation according to the present invention.

DETAILED DESCRIPTION AND PREFERRED EMBODIMENTS

While the description and drawings refer generally to insulation products of comprising a glass fiber insulation material, it is to be understood that the insulation material can be any compressible fibrous insulation material, such as rock wool, polypropylene, polyester, or cotton.

According to the present invention, a polymeric skin layer is applied to three or four sides of an insulation batt, typically a fiber glass batt, using a sequence of spray coating and curing processes to produce an encapsulated irritation free insulation product. A range of thermoplastic and thermoset polymer materials, such as a polyethylene emulsion, a polypropylene emulsion, a styrene butadiene rubber (SBR) latex, or a polyvinyl alcohol (PVA) solution, may be applied to the fiber batt, with SBR latex and PVA solution being especially preferred. The coating materials can also include one or more of a variety of additives including lubricants, dust suppressing agents, coupling agents, surfactants, wetting agents, colorants, UV stabilizers, fire retardants and moisture repelling agents.

Once formed, the encapsulating "skin" layer shields handlers from irritation resulting from contact with the fiber batt and functions as an integral part of the glass insulation product. In one embodiment, the resulting product may be partially encapsulated by the binder skin layer with a manufactured PE film separately applied to a major surface of the bait to act as a vapor retarder (VR) to form a "faced" insulation product. If a hot melt glue is used to adhere the PE film to the fiber batt, the glue is preferably applied in a discontinuous pattern and at a rate sufficiently low that the resulting insulation product will still have a low organic content and pass a flame spread test according to ASTM E-84 "Standard Test Method for Surface Burning Characteristics of Building Materials" also known as the "Tunnel Test."

Figure 1:
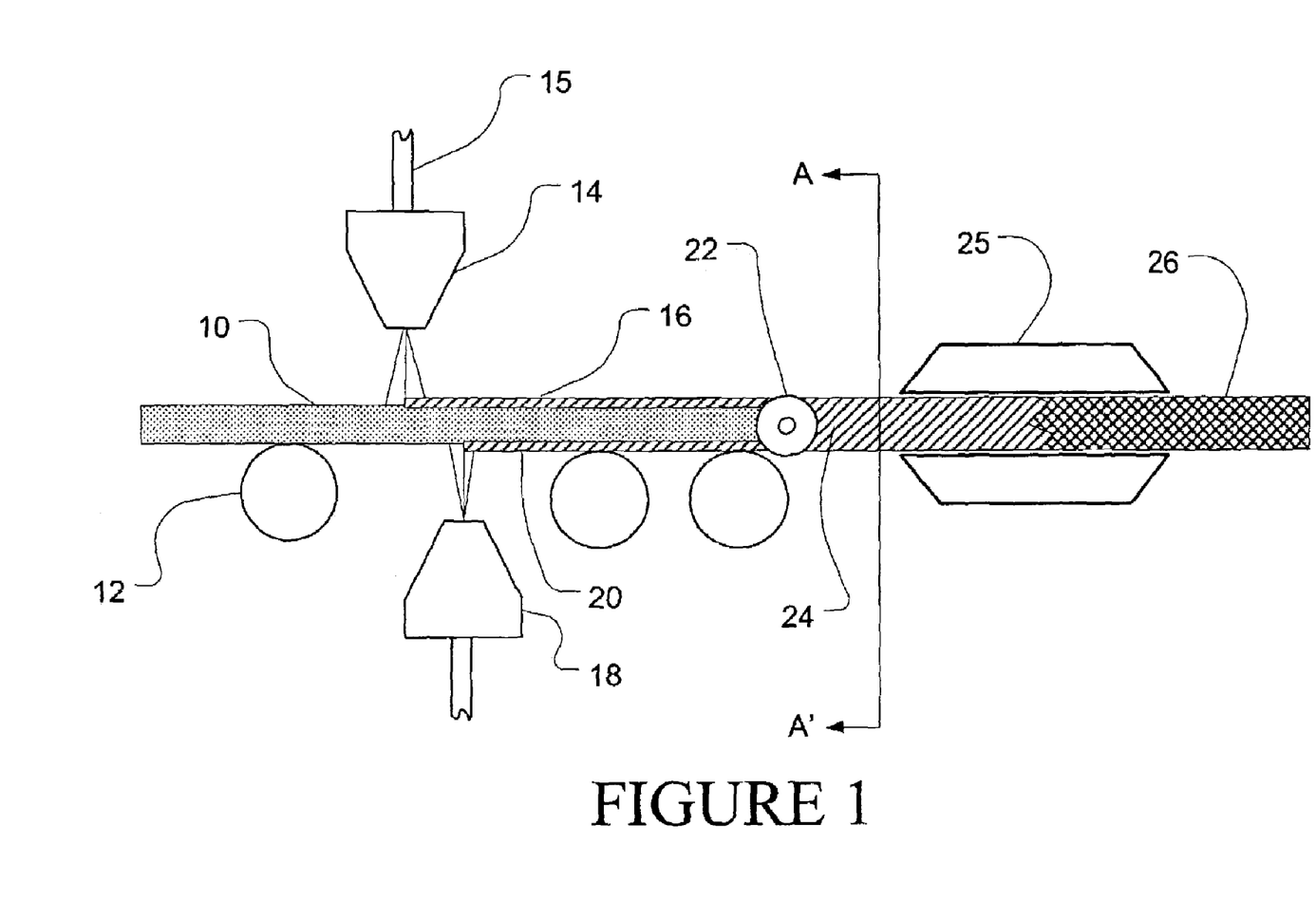
FIG. 1 is a side view illustrating certain components in a first embodiment of an apparatus for manufacturing an encapsulated fiber batt.

As illustrated in FIG. 1, a continuous glass fiber batt 10 is prepared by collecting glass fibers, coating them with a binder composition, and then drying and curing the binder. The fiber batt is then moved across a series of rollers 12 and/or belts or other conveyors so that a surface of the fiber batt passes near a first spray head 14. A supply line 15 provides an aqueous or emulsified coating composition, preferably a SBR latex, to the first spray head so that as the fiber batt passes near the spray head a thin layer of the coating composition 16 can be deposited on and near the surface of the fiber batt. As the fiber batt proceeds, it passes near additional spray heads 18, 22 arranged and configured to apply additional thin layers of the coating composition 20, 24 to other surfaces of the fiber batt and form a substantially continuous encapsulating layer around the fiber batt. The encapsulated fiber batt is then moved through an oven or other heating device 25 where the encapsulating layer is dried and cured to form an encapsulating layer 26.

The coating composition used in the spray process may be held in a reservoir as applied or as a premix solution that may then be diluted or emulsified to form the coating composition prior to application by the spray nozzles. This coating composition is then delivered in a controlled, and preferably metered, manner to the spray heads for deposition of a predetermined quantity onto the respective surfaces of the fiber batt.

As will be appreciated, the order in which the various surfaces of the fiber batt 10 are coated may be altered and multiple surfaces may be coated simultaneously while still achieving the desired degree of encapsulation. Similarly, depending on the dimensions of the fiber batt, one or more rows of spray heads may be aligned in a direction generally perpendicular to the direction of travel of the fiber batt for coating a single surface. A sequence of spray heads may also be arranged along the direction of travel of the fiber batt for sequentially applying a series of light coating layers to achieve the desired thickness for the encapsulating layer and may include some drying of the applied layers before the application of the next coating layer. Similarly, it is possible to vary the thickness and/or the composition of the coating applied to different surfaces of the fiber batt to adjust the properties of the resulting insulation product.

Figure 2:
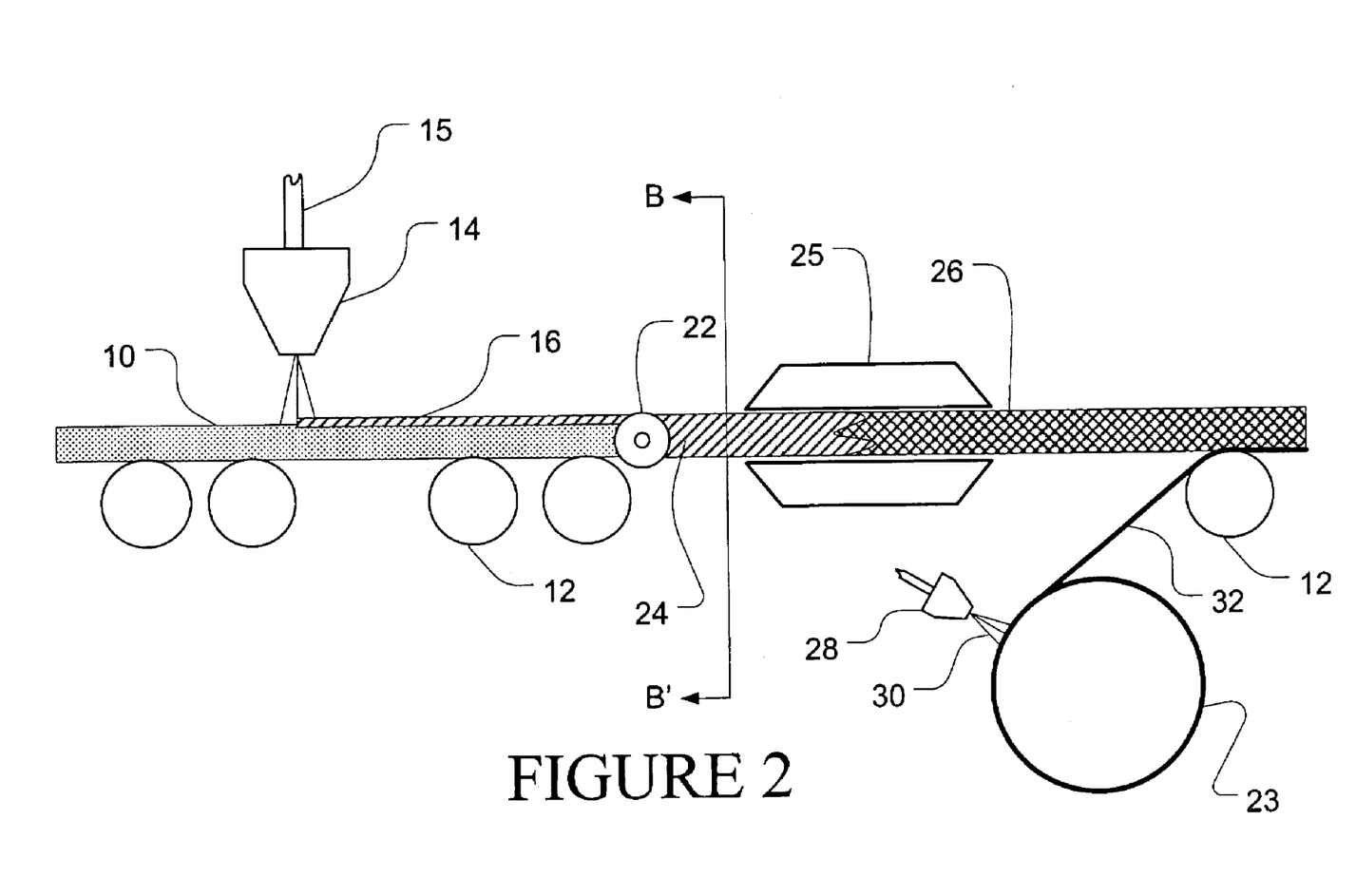
FIG. 2 is a side view illustrating certain components in a second embodiment of an apparatus for manufacturing an encapsulated fiber batt incorporating a vapor barrier layer.

As illustrated in FIG. 2, in a second embodiment of the invention, the fiber batt 10 is moved past a series of spray heads 14, 22 from which a polymeric coating layer is applied to one or more surfaces of the fiber batt. As illustrated, a polymeric coating layer 16 may be applied to a first major (upper) surface followed by polymeric coating layers 24 applied to each of the minor (side) surfaces to partially encapsulate the fiber batt. The partially encapsulated fiber batt is then fed into an oven or other heating device 25 where the polymeric coatings are cured to form a fused layer 26 on the coated surfaces of the fiber batt. The fiber batt 10 is then moved past a payout stand or reel 23 from which a vapor retarder layer 32, preferably a polyethylene film, is removed for application to an uncoated surface of the fiber batt. The vapor retarder layer 32 may then be coated with a discontinuous layer of an adhesive 30 from a spray head 28. If a hot melt adhesive is used, spray head 28 is preferably a hot melt spray gun or nozzle to which a molten adhesive and heated air are supplied. The adhesive-coated vapor retarder layer is then applied to a surface of the fiber batt using a series of rollers 12 or belts (not illustrated) to press the vapor retarder layer against and adhere it to the fiber batt.

Although, as illustrated, the vapor retarder layer is applied to the fiber batt after the coating layers, if the vapor retarder layer material and the adhesive can tolerate the temperature used in the oven 25, it may be applied before the coating layers are formed. As an alternative to vapor retarder layers, a layer of Kraft paper can also be applied to one or more surfaces of the fiber batt in much the same manner using an asphalt-based or other suitable adhesive.

Figure 3A:
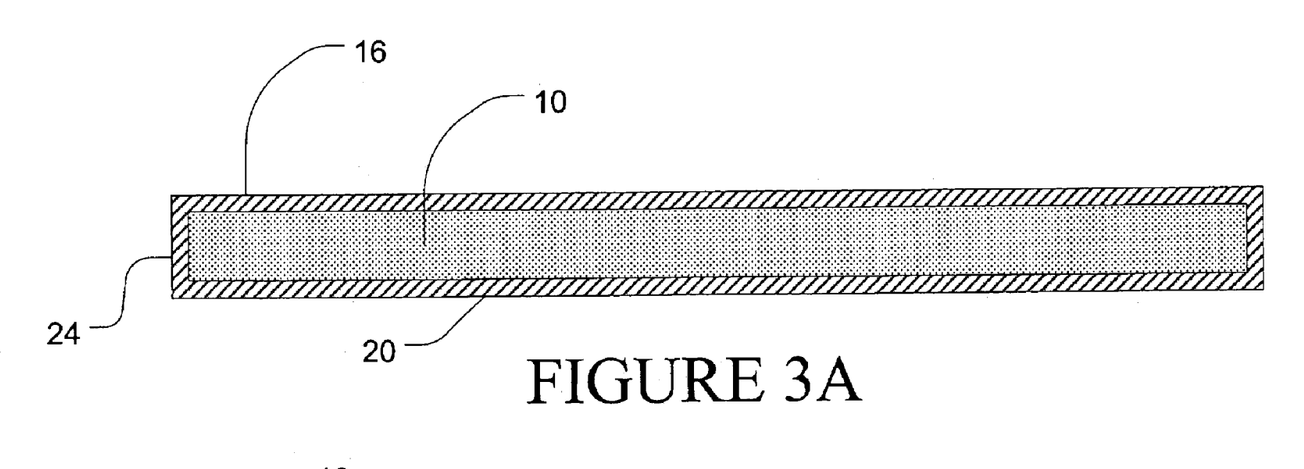
FIGS. 3A and 3B are cross-sectional views along line A–A' in FIG. 1 and line B–B' in FIG. 2 respectively illustrating certain components and two embodiments of the encapsulated fiber batt produced according to the present invention.
Figure 3B:
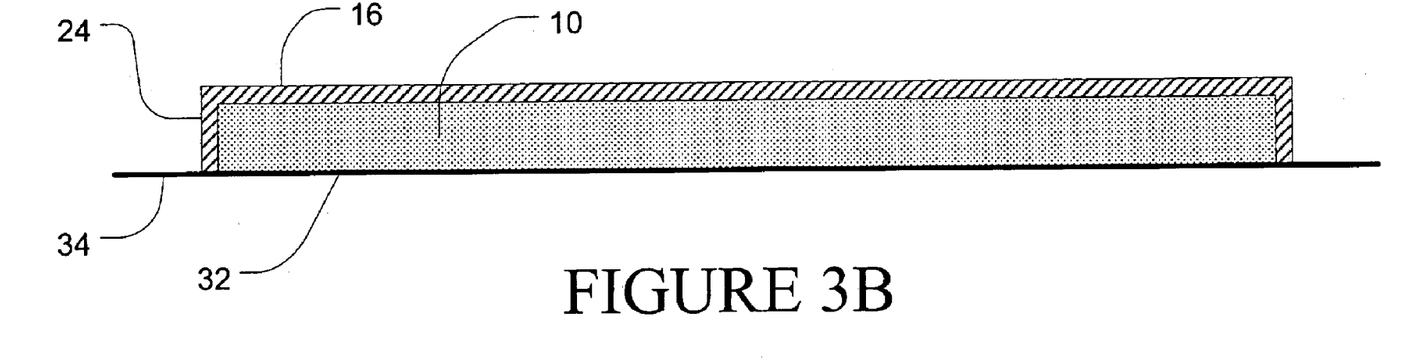

As illustrated in FIG. 3A, representing a cross section at line A–A' in FIG. 1, the finished insulation product is fully encapsulated by the binder layer. As illustrated in FIG. 3B (Note: please keep "32" and delete "20" in FIG. 3B), representing a cross section at line B–B' in FIG. 2, the finished insulation product is partially encapsulated by a binder layer with a vapor retarder layer 32 provided on one of the major faces.

Figure 4A:
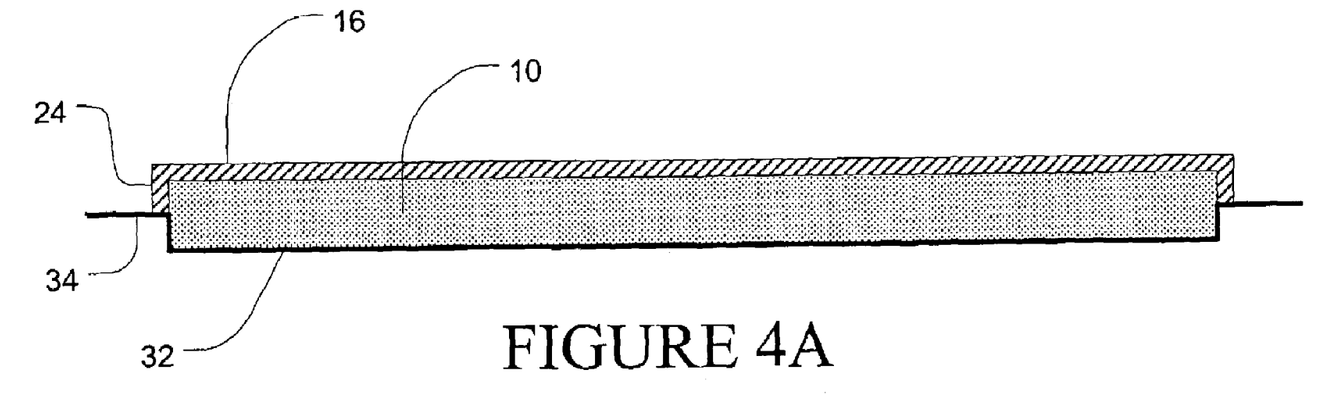
FIGS. 4A and 4B are cross-sectional views of alternative insulation products that may be formed according to the present invention with modifications in the arrangement of the facing layer.
Figure 4B:
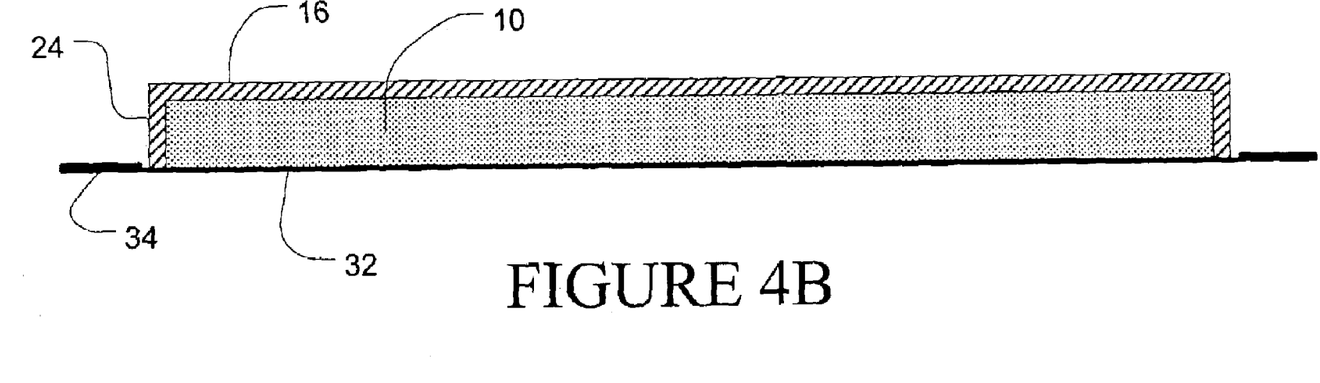

If a vapor retarder layer is applied, the vapor retarder layer may be sized to cover just one surface of the fiber batt or may be wider than the fiber batt so that excess vapor retarder film extends past the surface to which it is being applied by as much as four inches (10 cm) or more on each side of the fiber batt. If provided, this excess film may then be folded over and bonded together using glue, ultrasonic welding, or other fastening means to form two side flanges useful during the installation of the insulation product. As illustrated in FIGS. 4A and 4B the vapor retarder layer may also extend partially or completely along secondary (i.e., typically the side) surfaces and/or may be overlapped, to increase the mechanical strength or improve its edge appearance, or may be left as a single thickness flange, e.g., FIG. 3B.

The encapsulating layer is formed by depositing a thin layer of a coating composition on and near the surface of the fiber batt. The spacing between the fiber batt and the spray head, the viscosity of the coating solution, the angle of the spray head relative to the batt, the batt speed and the spray velocity are preferably selected to ensure that the coating composition does not penetrate deeply into the fiber batt but is confined to a narrow region near the surface of the batt. The encapsulating layer is preferably relatively thin, ensuring that the binder composition may be quickly dried and cured by heater 25 to form a fused encapsulating layer 26. The heater 25 may include one or more heating means, such as infrared (IR) or other radiant heat, forced hot air or microwave, to achieve the temperature necessary to dry and cure (or fuse) the polymeric component of the binder composition.

Once the encapsulation layer has been formed, the encapsulated batt may be sent to a chopping station where the continuous glass fiber batt may be chopped into insulation products of various standard or custom lengths. The insulation product is then typically sent to a packaging station (e.g., a BRU (belt roll up) or a BIB (batts-in-bag) bagger) to prepare the insulation product for shipping and storage.

Figure 5A:
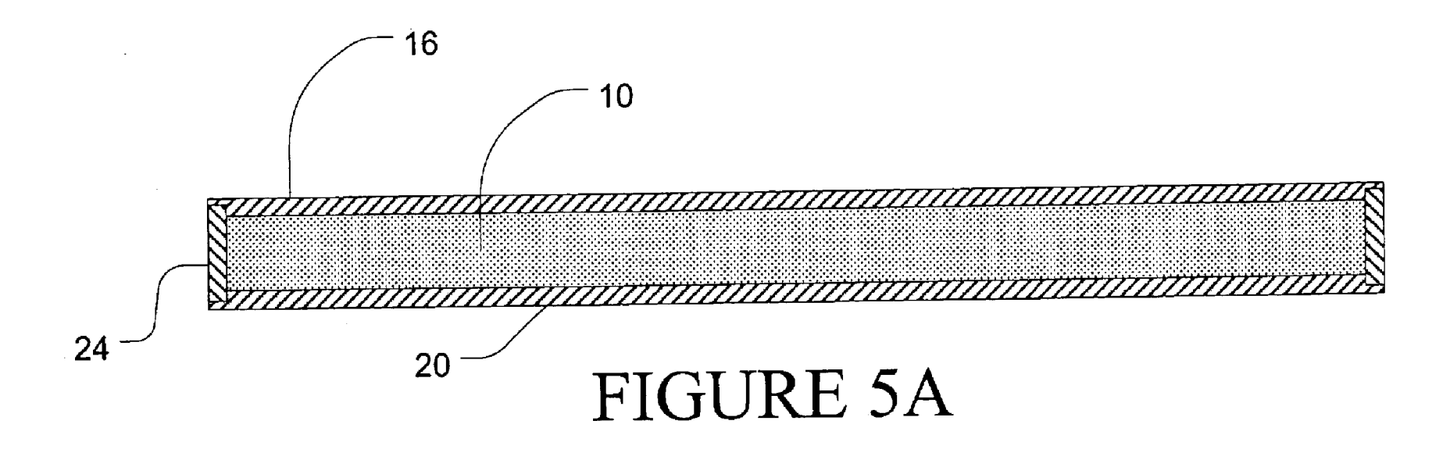
FIGS. 5A and 5B are cross-sectional views of alternative insulation products that may be formed according to the present invention with modifications in the polymeric coating compositions applied to the respective surfaces of the fiber batt.
Figure 5B:
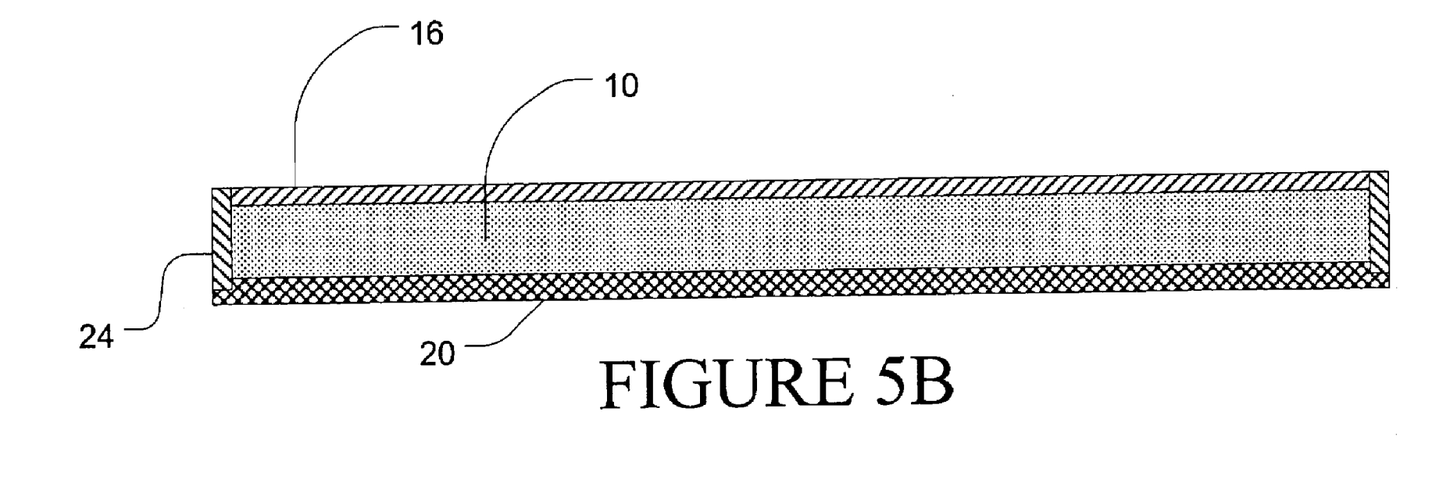

As illustrated in FIGS. 5A and 5B, different materials may be applied to different surfaces of the fiber batt to modify the appearance and/or properties of the various surfaces to form customized insulation products. As illustrated in FIG. 5A, the major surfaces of the batt 10 have a coating layer 16, 20 formed from a first material and the minor surfaces have a coating layer 24 formed from a second material. As illustrated in FIG. 5B, the upper surface of the fiber batt 10 has a coating layer 16 comprising a first material, the edge surfaces have a coating layer 24 comprising a second material, and the lower surface has a coating layer 20 comprising a third material. The differences between the various materials provide for different textures or permeability on different surfaces or may exhibit a different appearance or color to indicate to an installer the preferred installation orientation such as red or pink toward a warm space and/or blue toward a cold space.

EXAMPLE 1A 180 g of water and 20 g of Celvol®502 (polyvinyl alcohol) was added to a 500 ml beaker. The mixture was agitated, heated and held at 90° C. until the solid PVA was completely dissolved. The solution was cooled and 5 drops of red pigment were added to make pink solution. The solution was sprayed onto a fiber glass insulation batt surface and dried in a convection oven for 5 minutes at 150° C. The resulting coated fiber batt had a coating density of about 4 g/ft$^2$ (43 g/m$^2$) based on PVA solid with a surface that was slightly rigid and had a rough, sand paper-like feel.

EXAMPLE 1B 180 g of water and 10 g of Celvol® 502 was added to a 500 ml beaker. The mixture was agitated, heated and held at 90° C. until the solid PVA was completely dissolved. The solution was cooled and 5 drops of red pigment were added to make pink solution. The solution was sprayed onto a fiber glass insulation batt surface and dried in a convection oven for 5 minutes at 150° C. The resulting coated fiber batt had a coating density of about 2 g/ft$^2$ (21.5 g/m$^2$) based on PVA solid with a surface that was slightly rigid, slightly poor surface coverage and a rough, sand paper-like feel.

EXAMPLE 2A 180 g of water, 10 g of Celvol® 502 and 10 g of a lubricant, specifically Henkel's Emerest® 2648 (polyethylene glycol 400 dioleate), was added to a 500 ml beaker. The mixture was agitated, heated and held at 90° C. until the solid PVA was completely dissolved. The solution was cooled and 5 drops of red pigment were added to make pink solution. The solution was sprayed onto a fiber glass insulation batt surface and dried in a convection oven for 5 minutes at 150° C. The resulting coated fiber batt had a coating density of about 2 g/ft$^2$ (21.5 g/m$^2$) PVA and 2 g/ft$^2$ (21.5 g/m$^2$) lubricant for a total coating density of about 4 g/ft$^2$ (43 g/m$^2$). The resulting encapsulating layer had a more uniform appearance than examples 1A and 1B and a soft, smooth feel.

EXAMPLE 2B

After preparing the coating composition as in Example 2A, the coating was applied by paint brush, rather than spraying, to approximately the same surface density, i.e., 4 g/ft$^2$ (43 g/m$^2$), of total polymer (PVA) and lubricant. The resulting encapsulating layer had a uniform surface and a soft, smooth feel.

EXAMPLE 2C

After preparing the coating composition as in Example 2A, the coating was applied by paint brush, rather than spraying, to approximately half the surface density of Examples 2A and 2B, i.e., 2 g/ft$^2$ (21.5 g/m$^2$) of total polymer (PVA) and lubricant (Emerest 2462). The resulting encapsulating layer had a similarly uniform surface and a soft, smooth feel.

EXAMPLES 3B–C

Coating compositions were prepared and applied as in corresponding Examples 2B and 2C, but using an oil emulsion as the lubricant rather than the Emerest 2648. The resulted coated fiber batt surfaces, although uniform, had a much rougher feel than those of Examples 2B and 2C.

EXAMPLE 4B

The coating composition was prepared and applied as in corresponding Example 2B, but using a polyacrylic acid sodium salt as the polymer component rather than the Celvol® 502 polyvinyl alcohol. The resulting coated fiber batt surface was similar in appearance and feel to that of Example 2B, but was more moisture sensitive in that at 25° C. with a relative humidity above 80%, the surface became tacky.

EXAMPLES 5A–C

The coating compositions were prepared following the procedures outlined above in connection with Examples 1B, 2B and 2C but used equivalent amount of Noveon Good-Rite® SB-1168 (styrene butadiene) as the polymer component rather than the Celvol® 502 used in the previous Examples. The resulting surfaces were somewhat less uniform but similar to the coated fiber batt surface achieved in Example 2B. However, with the substitution of the styrene butadiene, the resulting surface was much less moisture sensitive than the surfaces prepared with compositions including polyvinyl alcohol.

The coating compositions and the results for each of the Examples described above is summarized in Table 1 below and illustrates that by adjusting the composition and ratios of the polymer and lubricant components a range of surface coating properties can be adjusted as desired.

TABLE 1

| | Polymer | Polymer Density g/m$^2$ | Lubricant | Lubricant Density g/m$^2$ | Appl. Method | Surface Visual | Surface Feel | Water Resist |
|---|---|---|---|---|---|---|---|---|
| 1A | Celvol ® 502 | 43.0 | None | 0.0 | S | Poor | Rough | |
| 1B | Celvol ® 502 | 21.5 | None | 0.0 | S | Poor | Rough | |
| 2A | Celvol ® 502 | 21.5 | Emerest 2648 | 21.5 | S | Poor | Soft | |
| 2B | Celvol ® 502 | 21.5 | Emerest 2648 | 21.5 | B | Good | Soft | |
| 2C | Celvol ® 502 | 10.8 | Emerest 2648 | 10.8 | B | Average | Soft | |
| 3B | Celvol ® 502 | 21.5 | Oil Emulsion | 21.5 | B | Good | Rough | |
| 3C | Celvol ® 502 | 10.8 | Oil Emulsion | 10.8 | B | Good | Rough | |
| 4A | PAA Na Salt[1] | 21.5 | Emerest 2648 | 21.5 | B | Good | Soft | Poor |
| 5A | SB-1168[2] | 21.5 | None | 0.0 | B | Good | Rough | Good |
| 5B | SB-1168 | 21.5 | Emerest 2648 | 21.5 | B | Good | Soft | Good |
| 5C | SB-1168 | 10.8 | Emerest 2648 | 10.8 | B | Good | Soft | Good |

[1]Sodium salt of polyacrylic acid (PAA)
[2]Noveon's Good-Rite ® SB-1168

In light of the results achieved with the batch testing reflected in Examples 1A–5C, a production spray line test was also conducted. The two spray systems utilized both included a number of spray nozzles, a flow meter, a pressurized liquid feed tank, a pressure gauge, and a header support. A series of six coating compositions were prepared and separately delivered to the spray nozzles (either liquid pressure type or air atomizing type) at a pressure ranging from about 30 psi to about 80 psi (210 to 550 kPa) to produce the coated fiber batt.

EXAMPLES

The six coating compositions utilized during this test were: (1) a 12.5 wt % aqueous solution of Celvol® 502 and Emerest® 2648 present in a 1:1 ratio; (2) a 12.5 wt % aqueous solution of Good-Rite® SB-1168; (3) a 12.5 wt % aqueous solution of Noveon's Hycar® 2671 (acrylic emulsion); (4) a 12.5 wt % aqueous solution of Noveon's Hystretch® Latex V-29; (5) a 25 wt % aqueous solution of Hystretch® Latex V-29; and (5) a 12.5 wt % aqueous solution of Hystretch® Latex V-29 and Emerest® 2648 present in a 1:1 ratio.

During the coating test, fiber glass insulation batt samples were passed below the spray nozzles at a rate of 62 ft/min (19 m/min) with the spray nozzles inclined at 45 degrees from the surface of the fiber batt to direct the spray in the direction of travel of the batt. The batt samples were weighed, passed once under the spray nozzles and weighed again to determine the coating density achieved based upon the coating solid and glass batt surface area. The coated samples were then dried in a conventional oven at 275° F. (121° C.) for 3-5 minutes before evaluating the surface coating performance. The results of these tests are reflected below in Table 2 for Examples 6–16.

TABLE 2

| | Coating Comp. | Spray Height (cm) | Nozzle Spacing (cm) | Liquid Pressure (kPa) | Coating Density g/m$^2$ | Surface Rating |
|---|---|---|---|---|---|---|
| 6 | 1 | 7.6 | 14.6 | 276 | 11.2 | Poor |
| 7 | 1 | 10.2 | 8.9 | 276 | 27.5 | Good |
| 8 | 1 | 10.2 | 8.9 | 345 | 35.8 | Excellent |
| 9 | 1 | 10.2 | 8.9 | 414 | 26.9 | Excellent |
| 10 | 1 | 10.2 | 8.9 | 552 | 57.6 | Excellent |
| 11 | 2 | 10.2 | 8.9 | 552 | 27.5 | Excellent |
| 12 | 3 | 10.2 | 8.9 | 552 | 30.1 | Excellent |
| 13 | 4 | 10.2 | 8.9 | 552 | 28.4 | Excellent |
| 14 | 5 | 10.2 | 8.9 | 552 | 72.4 | Good/Rigid |
| 15 | 6 | 10.2 | 8.9 | 414 | 50.4 | Good |
| 16 | 2 | 10.2 | 8.9 | 276 | 30.7 | Good |

The principle and mode of operation of this invention have been described in its preferred embodiments. However, it should be noted that this invention may be practiced otherwise than as specifically illustrated and described without departing from its scope.

We claim:

1. A method for manufacturing an encapsulated fiber batt comprising the steps of:
   conveying a fiber batt in a first direction, the fiber batt having n surfaces;
   providing a liquid polymeric coating composition to a plurality of spray heads, at least one spray head being arranged adjacent each of the n surfaces of the fiber batt, wherein said polymeric coating composition comprises a polyvinyl alcohol polymer and a polyethylene glycol dioleate additive, wherein the polymer and the additive are present in the coating composition in a ratio of about 1:1;
   forming a coating layer by spraying a stream of the liquid polymeric coating composition from an opening provided in each of the spray heads toward the surface of the fiber batt adjacent each of the spray heads;
   heating the liquid coating layer to dry and fuse the polymeric coating composition to form a substantially continuous polymeric skin layer on each of the n surfaces of the fiber batt and thereby encapsulate the fiber batt.

2. A method for manufacturing an encapsulated fiber batt according to claim 1, wherein:
   the lubricant comprises one or more lubricants selected from a group consisting of glycol, polyethylene glycol, mineral oil and emulsions thereof.

3. A method for manufacturing an encapsulated fiber batt according to claim 1, wherein:
   the polymer and the lubricant combined comprise between about 10 and about 80 weight percent of the coating composition.

4. A method for manufacturing an encapsulated fiber batt according to claim 1, wherein:
   the polymeric skin layer has a weight of between about 10 and about 75 grams per square meter.

5. A method for manufacturing an encapsulated fiber batt according to claim 4, wherein: the polymeric skin layer formed on a first surface has a weight of between about 10 and 30 grams per square meter and
   the polymeric skin layer formed on a second surface has a weight of between about 30 and 75 grams per square meter.

6. A method for manufacturing an encapsulated fiber batt according to claim 4, wherein:
   a first spray head is oriented at an angle relative to the adjacent surface of the fiber batt, the angle being between about 30 degrees and 150 degrees.

7. A method for manufacturing an encapsulated fiber ban according to claim 6, wherein:
   the angle is about 45 degrees.

8. A method for manufacturing an encapsulated fiber batt comprising the steps of:
   conveying a fiber batt in a first direction, the fiber batt having n surfaces;
   providing a liquid polymeric coating composition having a polymeric component to a plurality of spray heads, at least one spray head being arranged adjacent n−1 surfaces of the fiber batt, wherein said polymeric coating composition comprises a polyvinyl alcohol polymer and a polyethylene glycol dioleate additive, wherein the polymer and the additive are present in the coating composition in a ratio of about 1:1
   forming a liquid coating layer by spraying a stream of the liquid polymeric coating composition from an opening provided in each of the spray heads toward the surface of the fiber batt adjacent each of the spray heads;
   heating the liquid coating layer to dry and fuse the polymeric component to form a substantially continuous polymeric skin layer on fewer than n surfaces of the fiber batt and thereby partially encapsulate the fiber batt; and
   forming at least one additional encapsulating layer on each of the of n surfaces to which the Liquid coating layer was not previously applied to complete the encapsulation of the fiber batt.

* * * * *

UNITED STATES PATENT AND TRADEMARK OFFICE
CERTIFICATE OF CORRECTION

| | | |
|---|---|---|
| PATENT NO. | : 7,060,155 B2 | Page 1 of 1 |
| APPLICATION NO. | : 10/328968 | |
| DATED | : June 13, 2006 | |
| INVENTOR(S) | : Dong | |

It is certified that error appears in the above-identified patent and that said Letters Patent is hereby corrected as shown below:

Claim 7, Column 10, Line 36 – Should read "encapsulated fiber batt"

Signed and Sealed this

Twenty-second Day of August, 2006

JON W. DUDAS
*Director of the United States Patent and Trademark Office*